Patented Jan. 14, 1941

2,228,654

UNITED STATES PATENT OFFICE 2,228,654

ALKALINE EARTH METAL PHENATES AND PROCESS FOR THEIR PREPARATION

George H. Denison, Jr., Berkeley, and Arthur C. Ettling, Richmond, Calif., assignors to Standard Oil Company of California, San Francisco, Calif., a corporation of Delaware No Drawing. Application October 4, 1938, Serial No. 233,327

21 Claims. (Cl. 260—624)

This invention comprises new compositions of matter and an improved method of preparing alkaline earth metal phenates. More particularly, the invention relates to the production of alkaline earth metal phenates of high molecular weight phenols.

Methods utilized heretofore in the preparation of metal phenates have involved various difficulties. This is particularly true where the metal salts of relatively weak bases, such as the alkaline earth metals and high molecular weight phenols, are involved. Expensive starting materials, such as metallic calcium and/or extended purification methods, were sometimes necessary to obtain a product of the desired purity and characteristics.

Additional difficulties are encountered where the metal phenate contains a high molecular weight phenol, and the compound is amorphous and has a high melting point. It has been observed, for example, that when water is present during the preparation of such compounds the phenate tends to hold the water so intimately that its subsequent removal is troublesome. The water formed by reaction of a metal oxide or hydroxide with the phenolic acid is sufficient in some instances to introduce this difficulty.

We have discovered that alkaline earth metal compounds of a phenol can be advantageously prepared by reacting in a non-aqueous environment a carbide of a metal and a phenol. This process is particularly advantageous when applied to high molecular weight phenols. Despite the fact that the high molecular weight phenols are extremely weak and in general relatively unreactive, their metal salts have been obtained in an anhydrous and relatively pure condition by the process of this invention. High yields of the desired compounds have been obtained by using relatively cheap raw materials where prior processes either required more expensive reagents as starting materials or gave a less desirable reaction product.

The alkaline earth metal phenates in which a phenolic radical contains more than ten carbon atoms have not, to the best of our knowledge, been prepared heretofore and comprise new and useful compositions of matter. Alkaline earth metal phenates in which a phenolic radical contains an alkyl group of more than four carbon atoms, and more particularly more than ten carbon atoms, comprise preferred species of the new composition of matter.

Accordingly, an object of the invention is to provide a new and improved process for preparing alkaline earth metal phenates of high molecular weight phenols.

Another object of the invention is the provision of a new composition of matter comprising an alkaline earth metal phenate of a high molecular weight phenol in which the phenolic radical contains more than ten carbon atoms.

A further object of the invention comprises an improved process for preparing alkaline earth metal phenates in general and, more particularly, alkaline earth metal salts of alkyl phenols in which the alkyl portion of the phenolic radical comprises more than four carbon atoms.

An additional object of the invention is the production of a new composition of matter comprising an alkaline earth metal phenate of an alkyl phenol in which the alkyl portion of the phenolic radical contains more than four carbon atoms.

Further objects of the invention comprise the production of alkaline earth metal phenates of lauryl (dodecyl) phenol or cetyl phenol, such as calcium dodecyl phenate or calcium cetyl phenate.

The new compounds comprising the preferred species of this invention may be represented by the type formula—

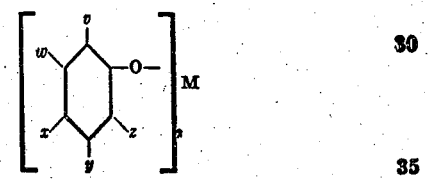

in which M is an alkaline earth metal, v, w, x, y and z are selected from the group consisting of hydrogen, hydrocarbon, oxy and hydroxyl radicals, and in which the phenolic radical has an alkyl group containing at least five carbon atoms and preferably more than ten carbon atoms. The hydrocarbon group above mentioned may be an alkyl, aryl, aralkyl, alkaryl or cyclic non-benzenoid group. By the term "oxy radical" hereinabove mentioned it is intended to designate a hydroxyl group in which the hydrogen has been replaced by esterification, neutralization or the like.

The new compounds herein disclosed may be added as ingredients in compositions such as hydrocarbon fuels, lubricating oils, drying oils, and the like. These compounds also comprise useful base materials for synthetic organic processes for the production of compounds where it is desirable to introduce a substituent containing an alkaryl group of the present phenolic type.

According to the invention alkaline earth metal phenates are prepared by direct reaction between the corresponding phenol and the alkaline earth metal carbide. The process is applicable to the alkaline earth metal carbides and phenols in general. The reaction occurring may be represented as follows:

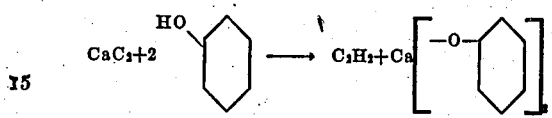

In the above reaction and equation the phenol may also be a polyhydroxy phenol or a substituted phenol containing an alkyl, aryl, alkaryl, aralkyl or cyclic non-benzenoid group. The process is also applicable to the preparation of phenates of polycyclic phenols in which the benzene rings may or may not be conjugated. The term phenols is used herein to designate generically compounds which contain one or more hydroxyl groups directly attached to an aromatic nucleus.

In the preferred embodiment of the process an alkyl phenol containing more than four carbon atoms, for example lauryl or cetyl phenol, is reacted with calcium carbide at elevated temperatures, e. g. 450° to 550° F. The lauryl or cetyl phenol utilized may be prepared by condensing phenol with an olefine corresponding to the alkyl group. The reaction involved in the preparation of these phenols may be represented as follows:

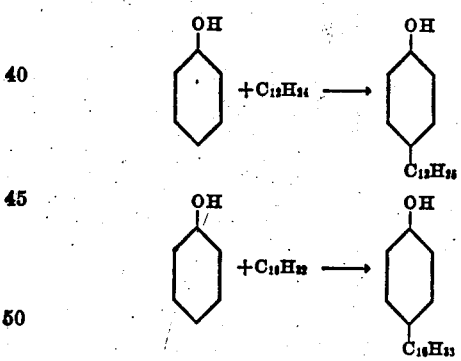

Suitable condensing agents for the above reaction comprise sulfuric acid, aluminum chloride, zinc chloride and the like. A specific example of a method of preparing an alkyl phenol to be utilized in the process of this invention comprises the following:

Example 1.—Phenol and a butene polymer having an apparent molecular weight of 194 and obtained by polymerization of a mixture of butenes containing butene-1, butene-2, and iso-butene were mixed. To this mixture containing 237 grams of phenol and 500 grams of the above mentioned butene polymers, 140 cubic centimeters of 94% sulfuric acid were added slowly with agitation. The temperature was kept below 65° F. during addition of the acid. The mixture was agitated for two hours after the addition of acid was completed and permitted to come to room temperature. The reaction product was then diluted with an equal volume of water and placed in a sealed autoclave where it was heated at 350° F. for an hour with agitation. The product was washed with water, 5% sodium carbonate solution and again with water in order to free it of sulfuric acid sulfonates and unreacted phenol. A 93% yield of high molecular weight water-insoluble alkyl phenol having an acetyl number of 181 was obtained.

An additional example of a method of preparing alkyl phenols suitable for use in the process of this invention comprises:

Example 2.—511 grams of crude cresylic acid, 900 grams of olefine polymers containing an average of 14 carbon atoms per molecule, and 475 grams of 98% sulfuric acid were utilized in preparing an alkylated cresol. These ingredients were combined and treated in the manner described above for preparation of cetyl phenol. The product was vacuum-distilled at 10 mm. and a 50 to 90% cut of an alkyl phenol obtained which had a molecular weight of 291 and was used to prepare the calcium salt hereinafter described in Example 6.

The above method of preparing the alkyl phenols is merely illustrative. Other condensation reactions utilizing alcohols or alkyl chlorides rather than olefines as a starting material may be adopted for introducing an alkyl group into the aromatic nucleus. A mixture of sulfuric and glacial acetic acids may be used with advantage as a condensing agent. A suitable mixture comprises 100 parts by weight 98% $H_2SO_4$ to 60 parts by weight of glacial acetic acid. The presence of the acetic acid facilitates temperature control and gives a softer, easier handled reaction product.

As has been previously indicated, alkaline earth metal phenates are, according to the present invention, prepared by directly reacting the phenol with an alkaline earth metal carbide. For purposes of illustration only, and without any intention of limiting the invention thereto, the following specific examples are given:

Example 3.—247 grams of an alkylated phenol, having an apparent molecular weight of 247, were agitated for six hours at 500° F. with 64 grams of powdered calcium carbide. A gaseous reaction product containing acetylene was formed and removed. The product remaining in the reaction zone was a dark-colored brittle solid at room temperature and comprised a metal salt of the alkylated phenol. 94% of the theoretical yield of calcium alkyl phenate was obtained as shown by an analysis of a sample of the reaction product freed from calcium carbide by filtration of its petroleum ether solution.

Example 4.—685 grams of an alkylated phenol, having an apparent molecular weight of 290, were agitated for six hours at from approximately 500° to 540° F. with 90 grams of calcium carbide. A gas containing acetylene was formed and removed. The product remaining in the reaction zone was a dark-colored brittle solid at room temperature. A yield of calcium alkyl phenate representing 96% of that theoretically possible was obtained.

Example 5.—44 grams of p-cyclohexyl phenol and 20 grams of powdered calcium carbide were heated together at 350° F. for one hour. The product was a tan colored powder insoluble in petroleum ether, soluble in benzene, and comprising the calcium salt of p-cyclohexyl phenol.

Example 6.—234 grams of an alkyl cresol (molecular weight 291) and 25 grams of powdered calcium carbide were heated at 530° F. with stirring for four hours. The product obtained comprising the calcium salt of alkyl cresol was a hard brittle solid, soluble in mineral oil.

The calcium phenates of high molecular weight alkyl phenols are characterized by high oil solubility and, when prepared by the method herein disclosed, are free from entrained, absorbed or dissolved water. Calcium cetyl phenate, for example, is an amorphous solid at normal atmospheric temperature, softens at 200° F., is fairly fluid at 400° F. and is highly soluble in mineral oil and other organic solvents. The solid calcium cetyl phenate is dark green in color.

The process of this invention has a number of advantages. It avoids the use of an aqueous solvent as a medium for effecting the reactions and thereby precludes difficulties often encountered by reason of hydrolysis of the reaction product which in turn decreases yields and introduces impurities. The process permits the production of high yields of alkaline earth metal phenates even though the alkyl phenols are relatively unreactive and substantial yields are in some cases not obtainable even in media where reactivity of stronger phenols is known to be many times greater than the reactivity of the water-insoluble phenols in non-aqueous environments. It will be noted that acetylene rather than water is formed by the reaction of the phenols and the carbide, and that this gas is easily removed without undue contamination or modification of the finished product. This last feature is of particular utility in that the necessity for removing substantial amounts of reaction products comprising inorganic solids, water or components resulting from side reactions with water is avoided. Other advantages of the process will be apparent to those skilled in the art.

While the character of the invention has been described in detail, and numerous examples of the preparation and application of the invention given, this has been done by way of illustration only and with the intention that no limitation should be imposed upon the invention thereby. It will be apparent to those skilled in the art that numerous modifications and variations of the illustrative examples may be effected in the practice of the invention, which is of the scope of the claims appended hereto.

We claim:

1. A process of preparing metal phenates which comprises reacting a carbide of an alkaline earth metal with a phenol in an environment substantially free of water, whereby an alkaline earth metal phenate and a gaseous reaction product are formed.

2. A process of preparing alkaline earth metal phenates which comprises reacting an alkaline earth metal carbide with a phenol containing more than ten carbon atoms in an environment substantially free of water, whereby an alkaline earth metal phenate and acetylene are formed.

3. A process of preparing metal phenates, which comprises directly reacting a carbide of an alkaline earth metal with a phenol containing at least sixteen carbon atoms in an environment substantially free of water, whereby an alkaline earth metal phenate and acetylene are formed.

4. A process of preparing calcium phenates, which comprises directly reacting calcium carbide with a phenol containing at least ten carbon atoms in an environment substantially free of water, whereby a calcium phenate and acetylene are formed.

5. A process of preparing metal phenates, which comprises directly reacting a carbide of an alkaline earth metal with a phenol of the type formula:

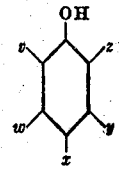

in which $v$, $w$, $x$, $y$ and $z$ are selected from the group consisting of hydrogen, hydrocarbon, and hydroxyl radicals and in which the phenolic radical has an alkyl group containing at least five carbon atoms, said reaction being effected in an environment substantially free of water, whereby an alkaline earth metal phenate and acetylene are formed.

6. A process of preparing alkaline earth metal phenates, which comprises directly reacting calcium carbide with a phenol of the type formula:

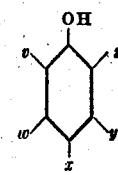

in which $v$, $w$, $x$, $y$ and $z$ are selected from the group consisting of hydrogen, hydrocarbon, and hydroxyl groups and in which the phenolic radical has an alkyl group containing at least ten carbon atoms, said reaction being effected in an environment substantially free of water, whereby calcium phenate and acetylene are formed.

7. A process of preparing an alkaline earth metal phenate, which comprises directly reacting in a substantially anhydrous environment a carbide of an alkaline earth metal with a lauryl phenol.

8. A process of preparing an alkaline earth metal phenate, which comprises directly reacting in a substantially anhydrous environment a carbide of an alkaline earth metal with a cetyl phenol.

9. An alkaline earth metal phenate in which a phenolic radical contains more than ten carbon atoms.

10. As a new compound, a calcium phenate in which a phenolic radical contains more than ten carbon atoms.

11. A metal phenate of the type formula:

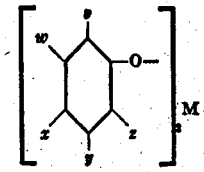

in which M is an alkaline earth metal, the phenolic radical has an alkyl group containing at least five carbon atoms, and $v$, $w$, $x$, $y$ and $z$ are selected from the group consisting of hydrogen, hydrocarbon, and hydroxyl radicals.

12. A compound as defined in claim 11, in which the metal is calcium.

13. An alkaline earth metal alkyl phenate containing an alkyl group having at least five carbon atoms.

14. An alkaline earth metal lauryl phenate.

15. An alkaline earth metal cetyl phenate.

16. A calcium alkyl phenate containing an alkyl group having at least five carbon atoms.

17. A calcium lauryl phenate.

18. A calcium cetyl phenate.

19. A process of preparing metal phenates which comprises reacting a carbide of an alkaline earth metal with a monohydroxy phenol in an environment substantially free of water, whereby an alkaline earth metal phenate and a gaseous reaction product are formed.

20. A process of preparing alkaline earth metal phenates which comprises reacting an alkaline earth metal carbide with a monohydroxy phenol containing more than ten carbon atoms in an environment substantially free of water, whereby an alkaline earth metal phenate and acetylene are formed.

21. An alkaline earth metal phenate in which a mononuclear phenolic radical contains more than ten carbon atoms.

GEORGE H. DENISON, Jr.
ARTHUR C. ETTLING.